United States Patent
Fahey et al.

[15] 3,668,946
[45] June 13, 1972

[54] HIGH-RATIO DRIVE MECHANISM
[72] Inventors: Thomas M. Fahey, Baltimore; John C. Mentzell, Severna Park, both of Md.
[73] Assignee: Westinghouse Electric Corporation, Pittsburgh, Pa.
[22] Filed: Aug. 5, 1970
[21] Appl. No.: 61,109

[52] U.S. Cl. ................................................74/640, 74/798
[51] Int. Cl. ...............................................F16h 13/06
[58] Field of Search ..................................74/640, 798

[56] References Cited

UNITED STATES PATENTS

| | | | |
|---|---|---|---|
| 3,199,370 | 8/1965 | Prior | 74/640 |
| 2,293,407 | 8/1942 | Schirrmeister | 74/798 |
| 2,528,470 | 10/1950 | Elder | 74/798 |
| 3,060,767 | 10/1962 | Parrett | 74/798 |
| 3,304,809 | 2/1967 | Hellen | 74/640 |

*Primary Examiner*—C. J. Husar
*Attorney*—F. Shapoe and L. P. Johns

[57] ABSTRACT

A rotary power transmission having a drive shaft and a driven shaft in parallel or coaxial alignment, a rigid annulus fixedly mounted around the drive shaft, the driven shaft having a flexible tubular end portion disposed between the drive shaft and the rigid annulus, and means including rollers between the drive shaft and flexible tubular end portion for transferring torque from the drive shaft to the flexible tubular end portion by frictional circumferential engagement and radial compression of the tubular end portion between the rollers and the rigid annulus.

10 Claims, 2 Drawing Figures

PATENTED JUN 13 1972 3,668,946

WITNESSES
Theodore F. Wrobel
James F. Young

INVENTORS
Thomas M. Fahey and
John C. Mentzell
BY Lee P. Johns
ATTORNEY

HIGH-RATIO DRIVE MECHANISM

BACKGROUND OF THE INVENTION

1. Field of the Invention:

This invention relates to a speed reduction and torque transmission drive mechanism.

2. Description of the Prior Art:

Gears are widely used means for speed reduction and torque transmission. When applied to high speed-reduction, high torque requirements, they may generate some serious inherent problems. For example, a gear drive to attain a torque of 500 inch-pounds and a 300-to-1 speed reduction, requires the stacking of pairs of gears in series and usually results in a mechanism of inordinate size and weight. Moreover, the efficiency of such a mechanism is reduced due to the large number of rubbing surfaces which are energy dissipators. Such gear assemblies also have torque transmission discontinuities due to backlash which are detrimental to high performance servo drive mechanisms.

A more recent development in the speed reduction and torque transmission state of the art is the so-called "harmonic drive" as described in "Gear Design and Application" by N. P. Chironis, pages 120 to 122, published by McGraw-Hill Book Company in 1967. Such drives are also shown in U.S. Pat. Nos. 2,906,143, 3,435,705, and 3,435,706. Although the harmonic drive involves an improved ratio of speed reduction to envelope size relative to gear trains, it has a limited torque transmission because it also employs gear teeth to transmit the torque. More particularly, the principle of harmonic drive speed reduction as disclosed in the foregoing publication and patents, involves the use of very fine gear teeth which inherently result in low torque transmission. Moreover, not only does the harmonic drive involve the backlash problem, but it generates relatively high torsional compliance due to the gear teeth and to the provision of considerable diametral distortion that is required for clearance of gear teeth.

SUMMARY OF THE INVENTION

In accordance with this invention it has been found that the foregoing difficulties may be overcome by a speed reduction device comprising a rigid member having an annular surface, a driven shaft having a flexible tubular end portion within the rigid annular surface, the facing surfaces of the rigid and flexible members being smooth-surfaced and frictionally engageable, a drive shaft parallel or coaxially disposed of the rigid annulus, a clearance space between the drive shaft and the driven flexible tubular end portion in which a pair of equally spaced rollers are each in roller engagement with the drive shaft and the flexible tubular end portion and the rigid annulus being fixed and the tubular end portion being rotatable between the rollers and the rigid annulus.

DESCRIPTION OF THE PREFERRED EMBODIMENTS

Figure 1:
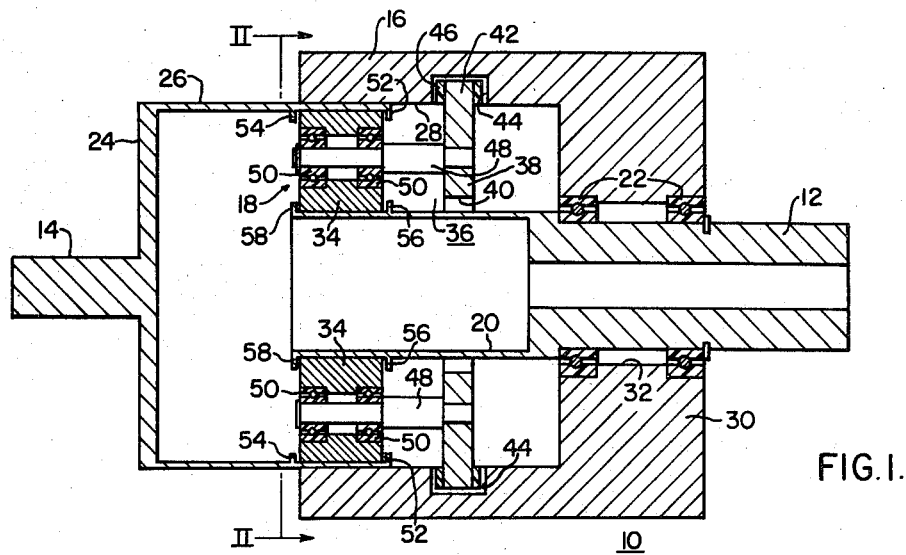
FIG. 1 is a vertical sectional view through one embodiment of the drive mechanism.

As shown in FIG. 1 a drive mechanism of this invention is generally indicated at 10. It includes a first shaft 12, a second shaft 14, a stationary member or housing 16, and means generally indicated at 18 for transferring a moment of force or torque from one shaft to the other.

For purposes of description of the drive mechanism 10, the first shaft 12 is designated as the input or drive shaft and the second shaft 14 is designated as the output or driven shaft, but the reverse operation is feasible. It is understood, however, that where the first shaft 12 is the input member, the drive mechanism functions as a speed reducing transmission. Contrarily, where the second shaft 14 is the input member and the first shaft 12 is the output member, the drive mechanism 10 functions as a speed increasing transmission.

The first shaft 12, being considered as the input or drive shaft for purposes of illustration, includes an end portion 20 and the shaft is substantially aligned with the shaft 14. The end portion 20 may be solid or, as shown, a hollow or tubular portion of the shaft 12 to accommodate slight deflections of the means 18 during operation of the mechanism. One purpose of enabling such deflections is to reduce the load of the shaft 12 on bearings 22 between the shaft and the member 16. Under substantially ideal conditions, however, the end portion 20 may be solid or similar to the remainder of the shaft 12.

The second shaft 14 includes a radial flange portion 24 bearing at its periphery a cylindrical tubular portion 26. The thickness of the wall of the tubular portion 26 is dependent upon the load transmitted through it to the shaft 14, but it is sufficiently thin to deflect due to any irregularities in the several contacting parts. The portion 26 extends into a bore 28 of the stationary member 16 and overlaps at least a part of the end portion 20 of the first shaft 12. The inner and outer surfaces of the portion 26 are smooth and as devoid of irregularities as is reasonably possible to provide.

Figure 2:
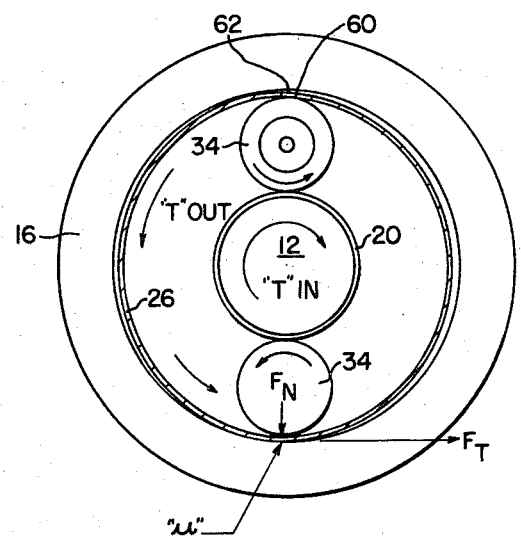
FIG. 2 is a transverse sectional view taken on the line II—II of FIG. 1.

The stationary member 16 may serve as a housing for the mechanism 10 as shown in the embodiment of FIGS. 1 and 2 or the member 16 may be a fixed annular body independent of a larger housing within which the mechanism may be enclosed. The bore 28 of the member 16 has a diameter that is greater than the outer surface of the tubular portion 26 of the shaft 14 (FIG. 2) and is smooth and is prepared to a perfectly round cylindrical surface which is as devoid of out-of-round surface irregularities or protuberances as is reasonably possible to provide. For the embodiment of the mechanism 10 shown in FIGS. 1 and 2, the member 16, serving as a housing for the mechanism, includes an inturned flange portion 30 with a bore 32. In FIG. 1 the first shaft 12 extends through the bore where it is secured in the bearings 22.

The torque transfer means 18 includes at least one roller, and preferably at least two planetary rollers 34 which are disposed between the end portion 20 and the portion 26 of the shaft 14. The rollers 34 are in tight fitting frictional engagement with the surfaces of the portions 20 and 26, whereby rotation of one portion is transmitted through the rollers to the other portion without slip or backlash. All of the parts 12, 14, 16 and 34 are preferably composed of materials that are commensurate with the torque level transmitted and for intended use of the drive mechanism. A suitable material for this purpose is stainless steel, but where the mechanism is used as a part of a toy one or more of the parts may be composed of a plastic material.

In addition to the foregoing, the mechanism may be provided with means generally indicated at 36 for holding the rollers 34 in equally space intervals and between the portions 20 and 26. The means 36 includes an annular retainer or ring 38 having an inner periphery 40 the diameter of which is greater than the outer diameter of the portion 20. The ring 38 has an outer peripheral portion 42 which extends into an annular notch 44 of the member 16. To minimize friction between the ring 38 and the radial walls of the notch 44, spacers 46, composed of minimum friction material such as Teflon, are provided on opposite sides of the peripheral portion 42. The ring 38 serves as a reference point for roller shafts 48. One end of each shaft 48 is secured in the ring 38 and the other end extends through a corresponding roller 34 where it is provided with bearings 50 in a suitable manner. The ring 38 maintains equal spacing for the rollers 34.

Thus, the rollers 34 are retained in place between the shaft portions 20 and 26 and prevented from gradually drifting laterally or circumferentially of the axis of the shafts 12 and 14.

Other retainer means may be provided for preventing the rollers 34 from drifting out of their desired positions. For example, the portion 26 of the shaft 14 may be provided with spaced inturned flanges 52 and 54. In addition, the portion 20 of the shaft 12 may be provided with spaced out-turned flanges 56 and 58.

In operation, when the shaft 12 is the input member the primary source of speed reduction in the mechanism is derived from the relative circumferences of the bore 28 and the deflective portion 26 of the shaft 14. In FIG. 2 consider, for example, a contact point 60 between the smooth contacting surfaces of the member 16 and the portion 26. When the roller 34 rolls completely around the bore 28 of the member 16, the original contact points of the member 16 and the portion 26 are no longer in contact. The original point on the portion 26 which was in contact at 60 has moved circumferentially to a point 62 on the member 16. The length of the arc between the points 60 and 62 is equal to the difference in circumference of the bore 28 and the outer circumference of the portion 26. Accordingly, for one revolution of the portion 26 the rollers 34 must make a number of trips around the bore 28. The number of trips is a ratio of the circumference of the inner surface of the bore 28 to the length of the arc between points 60 and 62.

An additional consideration in the speed reduction factor is the ratio of the diameter of the bore 28 to the outer diameter of the end portion 20. Thus the total speed reduction capability of the drive mechanism 10 is equal to the product of the circumference of the bore 28 to the arc length and the diameter of the bore to the outer diameter of the end portion 20.

The torque transmission of the drive mechanism 10 is dependent upon the coefficient of friction between the stationary member 16 and the portion 26 as well as the preload of the rollers 34. Referring to FIG. 2 a normal radial force Fn is created by preloading the rollers. A tangential force Ft, occurring during operation of the mechanism, is equal to the product of the coefficient of friction between the members 16 and 26 and the normal force Fn. The tangential force Ft is also produced at the opposite roller 34 creating a couple about the output shaft 14. The resulting torque is equal to the product of Ft and the diameter of the inner surface of the member 16. It is noted that the symmetrical tangential forces and upper and lower rollers 34 produces a couple about the output shaft 14 which eliminates any reaction force on the bearings 22 such as is sometimes produced between gear train shafts.

The maintenance of a relatively large normal force or preload, such as 1,000 ± 100 pounds, is achieved by the use of the hollow or tubular portion 20 of the shaft 12. The hollow or tubular portion 20 serves as a spring, and depending upon its material and dimensional parameters can maintain a reasonable stability of the preload magnitude. The deflective or spring effect of the tubular portion 20 eliminates problems that would otherwise occur due to dimensional variations of the component parts due to fabrication tolerances and temperature variations. An example of the problem due to dimensional variation which is solved by the use of a hollow or tubular portion 20 is cited. The total combined deflection to achieve a 1000 pound preload of the rollers 34 is approximately one thousandth (0.001) of an inch. Inasmuch as nominal fabrication tolerances of all the component parts normally adds up to more than 0.001 inch, the 1,000 pound preload could vary from zero to a force high enough to cause jamming of the mechanism. Thus, the hollow or tubular portion 20 of the shaft 12 compensates for those dimensional variations and maintains a reasonably constant preload which in turn assures a constant torque output.

In order for the foregoing results to occur, it is necessary that the rollers 34 be retained in their proper positions both circumferentially and axially. Thus the means 36 including the retainer 38 prevents the rollers 34 from drifting out of position circumferentially as well as axially during operation of the mechanism 10.

The following example is illustrative of the present invention.

EXAMPLE

For a member 16 having an inner diameter of 3.0 inches ($D_f$), a hollow portion 20 of the shaft 12 having a diameter of 1.000 inch ($D_s$), and a flexible or deflective cylindrical portion 26 of an output shaft having a diameter of 2.990 inches ($D_c$), the speed reduction is as follows:

$$\frac{N_s}{N_c} = \frac{D_f^2}{D_s(D_f - D_c)}$$

$$\frac{N_s}{N_c} = \frac{(3.000)^2}{1.000(3.000 - 2.990)} = 900/1.$$

where $N_s$ is the input shaft revolutions and $N_c$ is the output shaft revolutions. Thus, for the given dimensions, a speed reduction of 900 to 1 is obtained.

In addition, the torque ($T$) capability, that can be reasonably expected for the foregoing dimensions, for a nominal preload (Fn) of 1,000 pounds, and a coefficient of friction ($\mu$) of 0.39 for highly polished steel contacting surfaces of the members 16 and 26 (FIG. 2) is:

$$T = \mu F_n D_f$$
$$T = 0.39 (1,000) (3.00) = 1,170 \text{ pound inches}$$

A torque ($T$) transmitted is approximately 1,170 pound inches for the given facts.

Accordingly, the drive mechanism of the present invention satisfies several problems which existed in prior art constructions involving the so-called roller harmonic drives such as shown in U.S. Pat. No. 3,435,706. For a comparable size device there is a speed reduction capability of two to three times any prior art mechanism. Due to the maintenance of a high constant normal force between the rigid member 16 and the deflectable member 26 by means of the tubular portion of the input shaft, a very high torque transmission is obtained. Moreover, the device of the present invention does not have a limited torque capability due to the existence of very fine gear teeth between the contacting rigid and deflectable members; rather torque transmission is dependent upon friction between the members. The device of the present invention has the advantage of no backlash due to the absence of gear teeth between the contacting members. Conventional harmonic drives with their sliding tooth surfaces are therefore subject to greater energy dissipation. On the other hand, because of the rolling friction engagement between a rigid and deflective pair of surfaces, there is a minimum of energy loss.

In addition to the foregoing the high preload of the rollers is transmitted into the frame or rigid member 16 which greatly reduces the bearing wear and frictional losses. Nor is there a requirement for the matching of grinding techniques or precision tooth machining.

Various modifications may be made within the spirit of the invention.

What is claimed is:

1. A speed reduction drive mechanism comprising a first shaft, a second shaft, a fixed member having a circular relatively non-deflective smooth surface spaced from the first shaft, the second shaft having an annular end portion with an axis parallel to the non-deflective surface, the annular end portion being relatively deflective and having a smooth surface engageable with the relatively non-deflective smooth surface of the fixed member, the annular end portion of the second shaft being disposed between the first shaft and the non-deflective surface, torque reactive wave generator means between the first shaft and the deflective annular end portion for rollingly engaging and pressing the smooth surface of the end portion against and around the annulus, the means comprising at least two rollers, a ring, and roller mounting shafts on the ring, and the ring being axially spaced from the rollers.

2. The device of claim 1 wherein the first and second shafts are substantially aligned.

3. The device of claim 1 wherein the non-deflective surface and the annular end portion are coaxially disposed.

4. The device of claim 1 wherein the circumference of the annular end portion is less than that of the non-deflective surface.

5. The device of claim 1 wherein the first shaft is coaxially disposed of the circular non-deflective surface.

6. The device of claim 1 wherein the means hold the rollers equally spaced from each other.

7. The device of claim 1 wherein the first shaft end portion is tubular.

8. The device of claim 1 wherein rotation of the first shaft transmits a circumferential wave of radial deflection around the second shaft annular end portion.

9. The device of claim 1 wherein means are provided between the ring and the fixed member for preventing axial movement of the ring and the fixed member.

10. The device of claim 9 wherein the means for preventing axial movement comprises a notch in the inner surface of the fixed member and an outer peripheral portion of the ring extends into the notch.

* * * * *